United States Patent
Snyder (10) Patent No.: US 10,221,694 B2
(45) Date of Patent: Mar. 5, 2019

(54) GAS TURBINE ENGINE COMPONENT HAVING VASCULAR ENGINEERED LATTICE STRUCTURE

(71) Applicant: United Technologies Corporation, Farmington, CT (US)

(72) Inventor: Daniel A. Snyder, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 382 days.

(21) Appl. No.: 15/045,644

(22) Filed: Feb. 17, 2016

(65) Prior Publication Data

US 2017/0234143 A1    Aug. 17, 2017

(51) Int. Cl.

| F01D 5/18 | (2006.01) |
|---|---|
| F01D 5/14 | (2006.01) |
| F01D 9/02 | (2006.01) |
| F04D 29/38 | (2006.01) |
| F04D 29/54 | (2006.01) |
| F04D 29/58 | (2006.01) |

(Continued)

(52) U.S. Cl.
CPC ............ *F01D 5/187* (2013.01); *B22F 3/1055* (2013.01); *B22F 5/009* (2013.01); *B33Y 80/00* (2014.12); *F01D 5/147* (2013.01); *F01D 9/02* (2013.01); *F01D 9/041* (2013.01); *F01D 25/12* (2013.01); *F04D 29/388* (2013.01); *F04D 29/542* (2013.01); *F04D 29/582* (2013.01); *F05D 2220/32* (2013.01); *F05D 2230/22* (2013.01); *F05D 2240/81* (2013.01); *F05D 2250/60* (2013.01); *F05D 2260/202* (2013.01); *F05D 2260/204* (2013.01)

(58) Field of Classification Search
CPC .......... F01D 5/187; F01D 5/182; F01D 5/147; F05D 2240/81; F05D 2260/204; F05D 2260/203

See application file for complete search history.

(56) References Cited

U.S. PATENT DOCUMENTS

| 3,584,972 A | 6/1971 | Bratkovich et al. |
|---|---|---|
| 3,864,199 A | 2/1975 | Meginnis |

(Continued)

FOREIGN PATENT DOCUMENTS

| DE | 10261071 A1 | 7/2004 |
|---|---|---|
| EP | 0475658 A1 | 3/1992 |

(Continued)

OTHER PUBLICATIONS

European Search Report for Application No. 17156353.9 dated Jun. 19, 2017.

(Continued)

*Primary Examiner* — Ninh H. Nguyen
(74) *Attorney, Agent, or Firm* — Carlson, Gaskey & Olds, P.C.

(57) ABSTRACT

A flowpath component for a gas turbine engine includes a first platform including a vascular engineered lattice structure, a body extending from, and supported by the first platform. The body is configured to at least partially span a flowpath in an installed position and the vascular engineered lattice structure including at least one purge air inlet, and at least one spent air outlet.

17 Claims, 8 Drawing Sheets

(51) Int. Cl.
*F01D 25/12* (2006.01)
*B22F 3/105* (2006.01)
*B22F 5/00* (2006.01)
*F01D 9/04* (2006.01)
*B33Y 80/00* (2015.01)

(56) References Cited

U.S. PATENT DOCUMENTS

| | | |
|---|---|---|
| 3,900,629 A | 8/1975 | Spencer |
| 4,004,056 A | 1/1977 | Carroll |
| 4,091,146 A | 5/1978 | Darrow et al. |
| 4,168,348 A | 9/1979 | Bhangu et al. |
| 4,269,032 A | 5/1981 | Meginnis et al. |
| 4,292,376 A | 9/1981 | Hustler |
| 4,302,940 A | 12/1981 | Meginnis |
| 4,359,181 A | 11/1982 | Chisholm |
| 4,407,632 A * | 10/1983 | Liang ............... F01D 5/187 415/115 |
| 4,440,834 A | 4/1984 | Aubert et al. |
| 4,751,962 A | 6/1988 | Havekost et al. |
| 5,193,611 A | 3/1993 | Hesselgreaves |
| 5,197,852 A * | 3/1993 | Walker ............... F01D 9/065 415/115 |
| 5,353,867 A | 10/1994 | Jaspers |
| 5,370,499 A | 12/1994 | Lee |
| 5,545,003 A | 8/1996 | O'Connor et al. |
| 5,607,778 A | 3/1997 | Padden |
| 5,660,523 A | 8/1997 | Lee |
| 5,752,801 A | 5/1998 | Kennedy |
| 5,960,863 A | 10/1999 | Hua |
| 5,975,841 A | 11/1999 | Lindemuth et al. |
| 6,126,396 A | 10/2000 | Doughty et al. |
| 6,167,952 B1 | 1/2001 | Downing |
| 6,235,370 B1 | 5/2001 | Merrill et al. |
| 6,397,922 B1 | 6/2002 | Sachs et al. |
| 6,412,541 B2 | 7/2002 | Roesler |
| 6,508,623 B1 | 1/2003 | Shiozaki et al. |
| 6,511,762 B1 | 1/2003 | Lee et al. |
| 6,599,568 B2 | 7/2003 | Lee et al. |
| 6,617,003 B1 | 9/2003 | Lee et al. |
| 6,629,559 B2 | 10/2003 | Sachs et al. |
| 6,761,956 B2 | 7/2004 | Lee et al. |
| 6,955,523 B2 | 10/2005 | McClelland |
| 7,048,986 B2 | 5/2006 | Shah et al. |
| 7,063,131 B2 | 6/2006 | Northrop |
| 7,070,853 B2 | 7/2006 | Paul |
| 7,141,812 B2 | 11/2006 | Appleby |
| 7,144,220 B2 | 12/2006 | Marcin |
| 7,153,464 B2 | 12/2006 | Millard et al. |
| 7,204,089 B2 | 4/2007 | Schreiber |
| 7,255,536 B2 * | 8/2007 | Cunha ............... F01D 9/02 416/193 A |
| 7,294,164 B2 | 11/2007 | Merkel |
| 7,402,335 B2 | 7/2008 | Bolms et al. |
| 7,500,828 B2 | 3/2009 | Landis |
| 7,540,710 B2 | 6/2009 | Grote et al. |
| 7,597,533 B1 | 10/2009 | Liang |
| 7,658,590 B1 | 2/2010 | Spanks |
| 7,670,675 B2 | 3/2010 | Heselhaus |
| 7,717,677 B1 | 5/2010 | Liang |
| 7,775,766 B2 | 8/2010 | Meier et al. |
| 7,785,098 B1 | 8/2010 | Appleby et al. |
| 7,810,552 B2 | 10/2010 | Slaughter |
| 7,866,372 B2 | 1/2011 | Slaughter |
| 7,866,377 B2 | 1/2011 | Slaughter |
| 7,968,144 B2 | 6/2011 | James et al. |
| 8,052,389 B2 | 11/2011 | Kopmels |
| 8,061,146 B2 * | 11/2011 | Joe ............... F01D 5/187 60/805 |
| 8,167,573 B2 | 5/2012 | Merrill et al. |
| 8,257,809 B2 | 9/2012 | Morrison et al. |
| 8,327,911 B2 | 12/2012 | Kush et al. |
| 8,714,926 B2 * | 5/2014 | Lee ............... F01D 5/187 416/97 R |
| 8,793,871 B2 * | 8/2014 | Morrison ............... B22D 19/00 29/527.5 |
| 2005/0045306 A1 | 3/2005 | Petervary et al. |
| 2006/0099074 A1 | 5/2006 | Kopmels |
| 2006/0251515 A1 | 11/2006 | Landis |
| 2006/0285975 A1 | 12/2006 | Landis |
| 2007/0031252 A1 | 2/2007 | Walters et al. |
| 2007/0214759 A1 | 9/2007 | Merkel |
| 2007/0243069 A1 | 10/2007 | Read |
| 2007/0275210 A1 | 11/2007 | Heselhaus |
| 2008/0254276 A1 | 10/2008 | James |
| 2009/0011919 A1 | 1/2009 | Noguchi et al. |
| 2010/0025001 A1 | 2/2010 | Lee et al. |
| 2010/0284798 A1 | 11/2010 | Campbell et al. |
| 2010/0291401 A1 | 11/2010 | Medina et al. |
| 2011/0180245 A1 | 7/2011 | Obana et al. |
| 2011/0262695 A1 | 10/2011 | Lee et al. |
| 2011/0265406 A1 | 11/2011 | Morrison et al. |
| 2011/0268580 A1 | 11/2011 | Bryk et al. |
| 2011/0293434 A1 | 12/2011 | Lee et al. |
| 2012/0006518 A1 | 1/2012 | Lee et al. |
| 2012/0034075 A1 | 2/2012 | Hsu et al. |
| 2012/0237786 A1 | 9/2012 | Morrison et al. |
| 2012/0243970 A1 | 9/2012 | Hellgren et al. |
| 2012/0291991 A1 | 11/2012 | Denkenberger |
| 2013/0001837 A1 | 1/2013 | Gohler et al. |
| 2015/0218962 A1 | 8/2015 | Weber et al. |
| 2015/0345304 A1 | 12/2015 | Mongillo et al. |

FOREIGN PATENT DOCUMENTS

| | | |
|---|---|---|
| EP | 1726785 | 11/2006 |
| EP | 0896127 B1 | 7/2007 |
| EP | 2199725 A1 | 6/2010 |
| EP | 2947274 | 11/2015 |
| GB | 2284825 A | 6/1995 |
| WO | 2003006883 A1 | 1/2003 |
| WO | 2007014005 A1 | 2/2007 |
| WO | 2011069015 A2 | 6/2011 |
| WO | 2011133359 A1 | 10/2011 |
| WO | 2013013995 A1 | 1/2013 |
| WO | 2015026430 | 2/2015 |
| WO | 2015057310 | 4/2015 |

OTHER PUBLICATIONS

International Search Report and Written Opinion of the International Searching Authority for International application No. PCT/US2013/032003 dated Dec. 17, 2013.

International Search Report and Written Opinion of the International Searching Authority for International application No. PCT/US2013/032202 dated Jan. 27, 2014.

International Search Report and Written Opinion of the International Searching Authority for International application No. PCT/US2013/041054 dated Sep. 4, 2013.

International Preliminary Report on Patentablity for PCT Application No. PCT/US2013/032003, dated Jul. 9, 2015.

International Preliminary Report on Patentability for PCT Application for PCT/US2013/0141054, dated Jul. 9, 2015.

International Preliminary Report on Patentability for PCT Application No. PCT/US2013/032202, dated Jul. 9, 2015.

* cited by examiner

GAS TURBINE ENGINE COMPONENT HAVING VASCULAR ENGINEERED LATTICE STRUCTURE

BACKGROUND

This disclosure relates to a gas turbine engine, and more particularly to a gas turbine engine component having a vascular engineered lattice structure.

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Due to exposure to hot combustion gases, numerous components of a gas turbine engine may include cooling schemes that circulate airflow to cool the component during engine operation. Thermal energy is transferred from the component to the airflow as the airflow circulates through the cooling scheme to cool the component. Known cooling schemes may be inefficient and lack structural integrity.

SUMMARY

In one exemplary embodiment a flowpath component for a gas turbine engine includes a first platform including a vascular engineered lattice structure, a body extending from, and supported by the first platform. The body being configured to at least partially span a flowpath in an installed position and the vascular engineered lattice structure including at least one purge air inlet, and at least one spent air outlet.

In another exemplary embodiment of the above described flowpath component for a gas turbine engine the at least one purge air inlet is an opening on a radially inward facing surface of the platform.

In another exemplary embodiment of any of the above described flowpath components for a gas turbine engine the radially inward facing surface of the platform at least partially defines a neck cavity.

In another exemplary embodiment of any of the above described flowpath components for a gas turbine engine the at least one spent air outlet includes at least one opening on a mating surface of the platform.

In another exemplary embodiment of any of the above described flowpath components for a gas turbine engine the mating surface is configured to face a mating surface of an adjacent platform in an installed configuration.

In another exemplary embodiment of any of the above described flowpath components for a gas turbine engine the at least one spent air outlet includes at least one opening on a gas path surface of the platform.

In another exemplary embodiment of any of the above described flowpath components for a gas turbine engine the at least one spent air outlet includes at least one opening on a mating surface of the platform.

In another exemplary embodiment of any of the above described flowpath components for a gas turbine engine the gas path surface is a radially outward facing surface of the platform.

In another exemplary embodiment of any of the above described flowpath components for a gas turbine engine the purge air inlet is configured to admit air sourced in a cavity circumferentially adjacent a neck of the flowpath component.

In another exemplary embodiment of any of the above described flowpath components for a gas turbine engine the body is supported between the first platform and a second platform, the second platform being spaced radially apart from the first platform, relative to an installed orientation of the flowpath component.

In another exemplary embodiment of any of the above described flowpath components for a gas turbine engine each of the first platform and the second platform include a vascular engineered lattice structure.

In another exemplary embodiment of any of the above described flowpath components for a gas turbine engine the vascular engineered lattice structures are connected as a single vascular engineering lattice structure.

In another exemplary embodiment of any of the above described flowpath components for a gas turbine engine each of the vascular engineered lattice structures is independent of each other of the vascular engineered lattice structures.

In one exemplary embodiment a cooling system for a gas turbine engine includes a flowpath component having a first platform including a vascular engineered lattice structure and a body extending radially from the platform, the body at least partially spanning a flowpath and a purge air source adjacent a root of the flowpath component and fluidly connected to the vascular engineered lattice structure.

In another exemplary embodiment of the above described cooling system for a gas turbine engine the first platform further includes a radially inward facing surface at least partially defining a neck cavity, the radially inward facing surface further including at least one inlet to the vascular engineered lattice structure.

In another exemplary embodiment of any of the above described cooling systems for a gas turbine engine the first platform further includes a radially outward facing surface having a plurality of exit holes fluidly connecting the vascular engineered lattice structure to a primary flowpath.

In another exemplary embodiment of any of the above described cooling systems for a gas turbine engine the exit holes are positioned on an aft half of the radially outward facing surface.

In another exemplary embodiment of any of the above described cooling systems for a gas turbine engine the first platform further includes a radially outward facing mating surface, and wherein the radially outward facing mating surface includes at least one exit hole fluidly connecting the vascular engineered lattice structure to a primary flowpath.

In another exemplary embodiment of any of the above described cooling systems for a gas turbine engine the first platform further includes a radially outward facing surface having a second plurality of exit holes fluidly connecting the vascular engineered lattice structure to a primary flowpath.

An exemplary method of cooling a platform within a gas turbine engine includes supporting at least one flowpath component via a first platform, passing cooling air through a vascular engineered lattice structure within the platform, thereby cooling at least one external surface of the platform, and expelling air from the vascular engineered lattice structure into a primary flowpath of the gas turbine engine.

The various features and advantages of this disclosure will become apparent to those skilled in the art from the following detailed description. The drawings that accompany the detailed description can be briefly described as follows.

DETAILED DESCRIPTION

Figure 1:
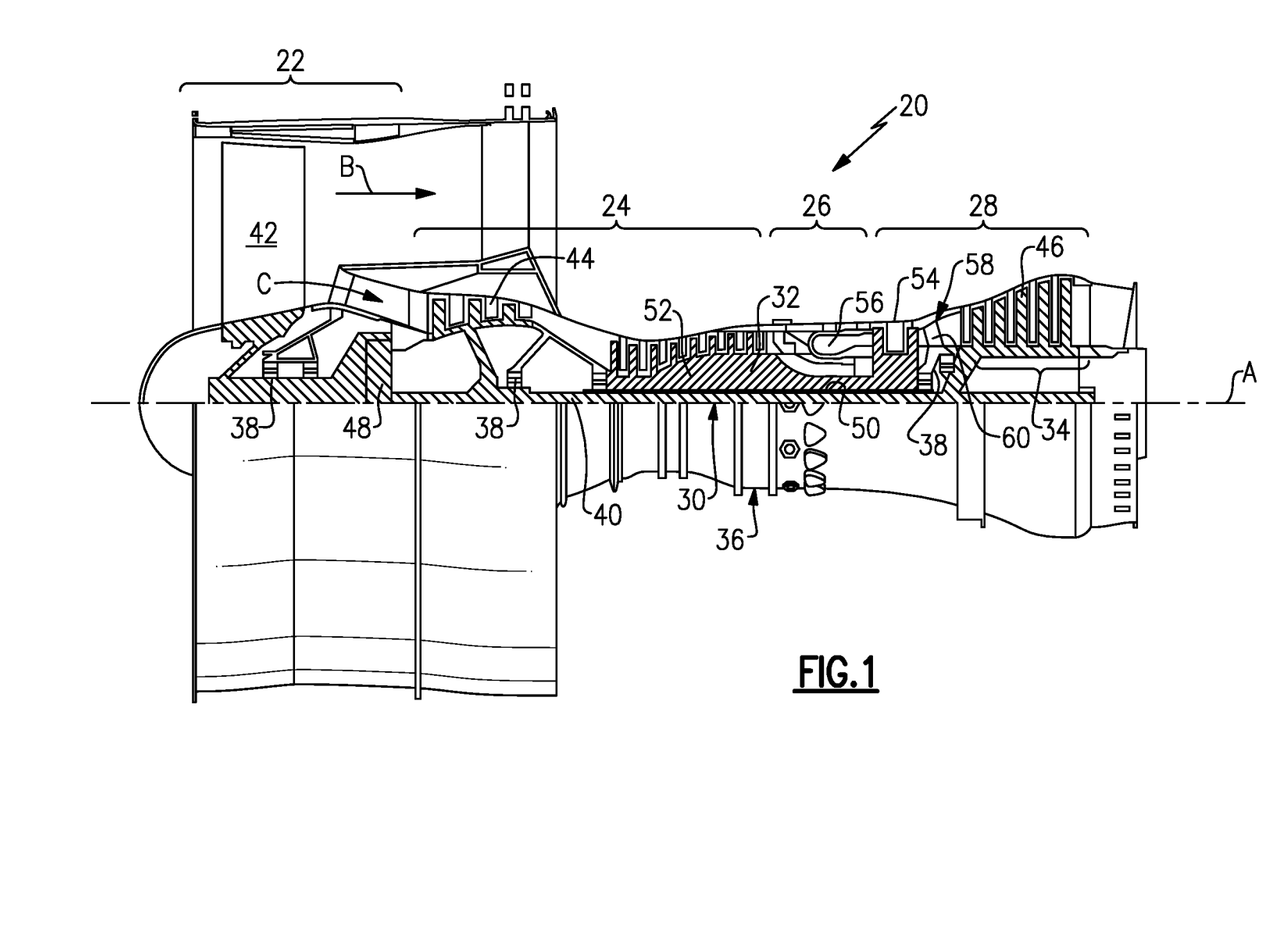
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °R)/(518.7°\ R)]^{0.5}$. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy.

Various components of the gas turbine engine 20, including but not limited to the airfoils of the blades 25 and of the vanes 27 in the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling schemes for cooling the parts during engine operation.

Among other features, this disclosure relates to gas turbine engine component cooling schemes that include vascular engineered lattice structures inside platforms supporting flowpath bodies in the primary flowpath. The exemplary structures described herein provide effective localized convective cooling for flowpath component platforms that may be subject to the hot combustion gases that are communicated through the core flow path C.

Figure 2:
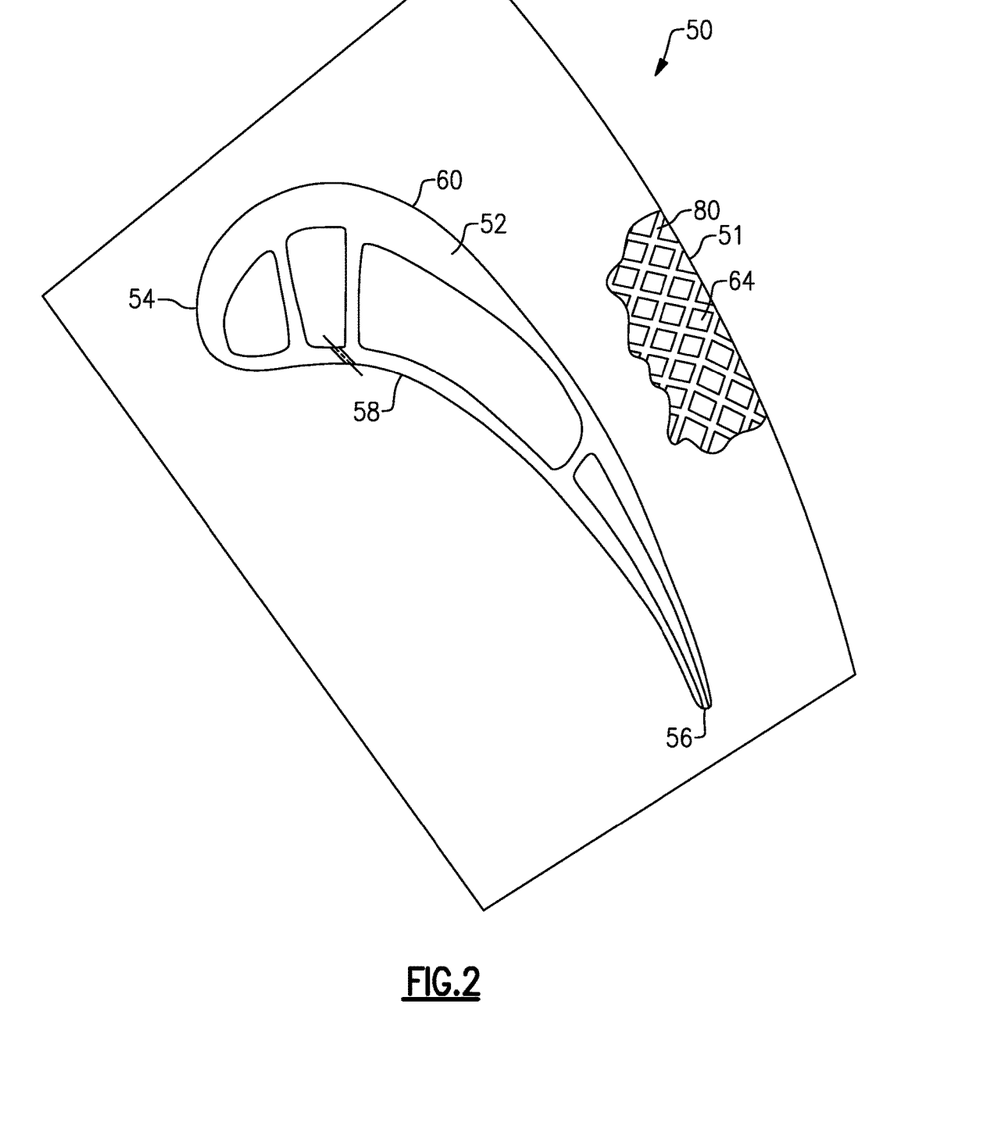
FIG. 2 schematically illustrates a radially inward facing view of a flowpath component from a radially outward position.

FIG. 2 illustrates an example component 50 that can be incorporated into a gas turbine engine, such as the gas turbine engine 20 of FIG. 1. The component 50 includes a body portion 52 that axially extends between a leading edge portion 54 and a trailing edge portion 56. The body portion 52 also extends radially outward from a platform 51. The body portion 52 may further include a first (pressure) side wall 58 and a second (suction) side wall 60 that are spaced apart from one another and axially extend between the leading edge portion 54 and the trailing edge portion 56. Although shown in cross-section, the body portion 52 would also extend radially across a span.

In this embodiment, the body portion 52 is representative of an airfoil. For example, the body portion 52 could be an airfoil that extends from the platform 51 and root portions (i.e., when the component is a blade), or could alternatively extend between inner and outer platforms 51 (i.e., when the component 50 is a vane). In yet another embodiment, the component 50 could include a non-airfoil component body spanning, or partially spanning, the flowpath and supported by one or more platforms 51.

A cooling scheme 64 may be disposed inside of the platform 51 for cooling the internal and external surface areas of the platform 51. The exemplary cooling scheme 64 may include one or more vascular engineered lattice structures 80 that are disposed inside portions of the platform 51 of the component 50. Of course, the component 50 could include greater or fewer vascular engineered lattice structures than are shown in FIG. 2. Discrete portions of the component 50 may embody a vascular engineered lattice structure 80, or the entire component 50 can be constructed of a vascular engineered lattice structure. Multiple non-limiting embodiments of such vascular engineered lattice structures are described in detail below with regards to FIGS. 6-12.

Figure 3:
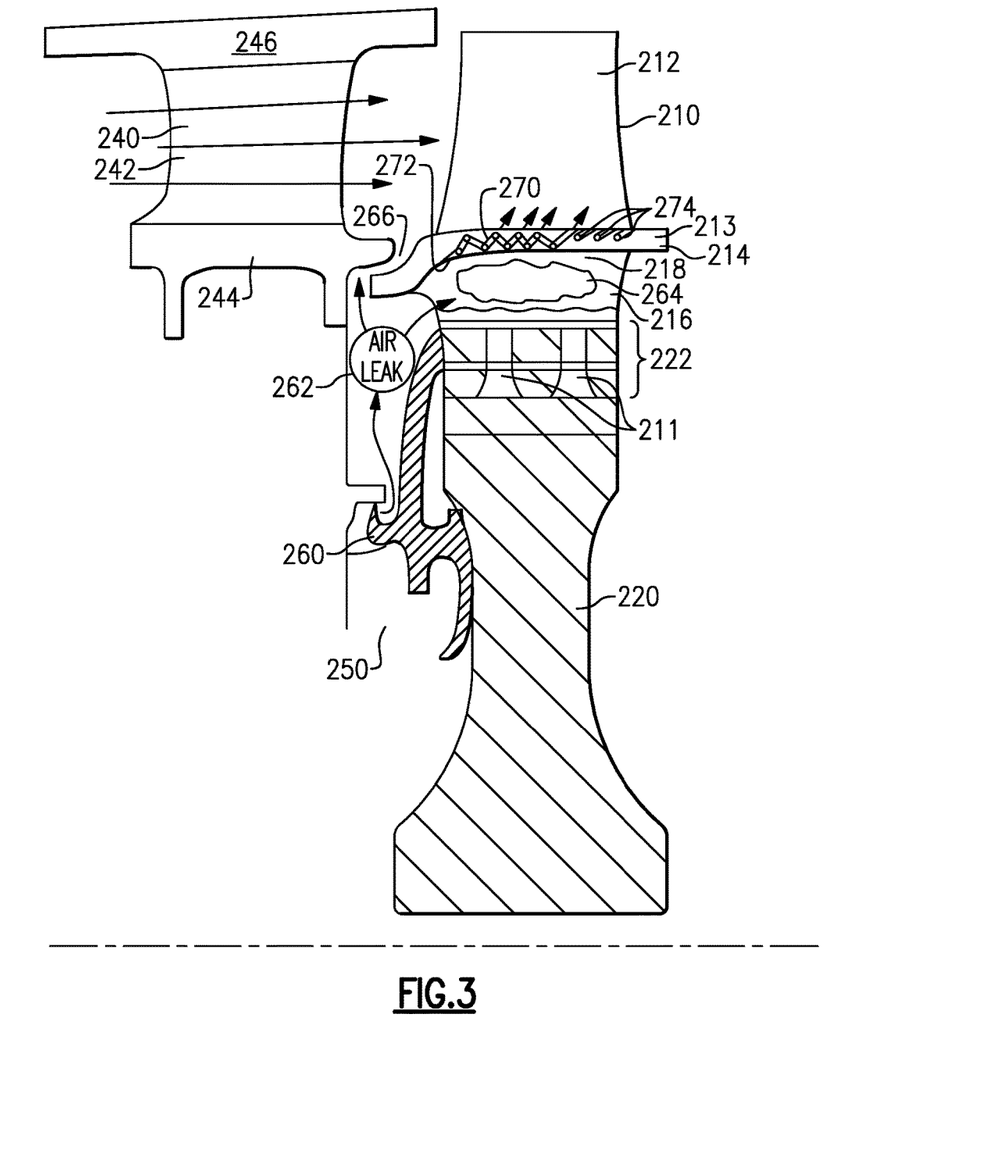
FIG. 3 schematically illustrates a side view of a flowpath component in an installed configuration within an exemplary gas turbine engine.

With continued reference to FIGS. 1 and 2, FIG. 3 schematically illustrates a side view of a rotor blade 210 in an installed configuration within an exemplary gas turbine engine, such as the gas turbine engine 20 of FIG. 1. In the illustration of FIG. 3, the rotor blade 210 is a rotor blade including a flowpath body 212 protruding radially outward into the primary flowpath, and a platform 214 supporting the flowpath body 212. The platform 214 is connected to a rotor disk 220 via a fir tree interface 222 at a root 216 of the rotor blade 210. The root 216 is connected to the platform 214 via a neck 218 that extends radially outward from the fir tree interface 222. In alternative examples, different interface styles may be used, in place of the fir tree interface 222, to connect the blade 210 to the rotor disk 220.

Forward of the rotor disk 220 is a vane 240. The vane 240 includes a flowpath body 242 supported by a radially inward platform 244 and a radially outward platform 246. Each of the platforms 240 is connected to a corresponding gas turbine engine static structure.

A cooling cavity 250 is disposed radially inward of the primary flowpath. Air from the cooling cavity 250 is provided to internal cooling passages 211 of the rotor blade 210 using any known cooling system. The internal cooling passages 211 provide direct cooling to the rotor blade 212. In alternative examples, alternative cooling systems may be utilized.

A seal 260 seals the cavity 250, and prevents hot flow from the primary flowpath from entering the cooling cavity 250. In order to ensure that no hot gasses flow from the primary flowpath into the cooling cavity 250 through the seal 260, cooling air is allowed to leak outward through the seal 260, along an air leakage pathway 262. In some examples, the air passing along the air leakage pathway 262 is referred to as purge air.

The air leakage pathway 262 enters a neck cavity 264 positioned between the platform 214 and the fir tree connection 222 on the rotor disk 220. The air leakage pathway 262 also passes through a gap 266 between the rotor blade 210 and the vane 240. In a conventional example, all of the purge air passes through the gap 266 and into the flowpath along the air leakage pathway 262.

In the illustrated example, the platform 214 includes a vascular engineered lattice structure 270 within the platform 214. The vascular engineered lattice structure 270 can be any vascular engineered lattice structure constructed according to the disclosure below, with regards to FIGS. 6-12. Purge air is allowed to enter the platform, from the neck cavity 264, via one or more inlets 272 disposed on a radially inward facing surface of the platform 214. The purge air passes through or around the vascular engineered lattice structure 270 within the platform 214, and provides cooling to the platform 214. The purge air exits the platform 214 at one or more exit holes 274, alternately referred to as spent air outlets. In some examples, the exit holes 274 are positioned on a mating face 213 of the platform 214. In alternative examples, the exit holes 274 are positioned on a radially outward facing surface of the platform 214. In yet further alternative examples, the exit holes 274 can be positioned on both the mating face 213 and the radially outward facing surface.

In this way, the vascular engineered lattice structure 270 provides an alternative leakage path while simultaneously allowing for cooling the platform 214 using air that is not directly source from a compressor bleed.

Figure 4A:
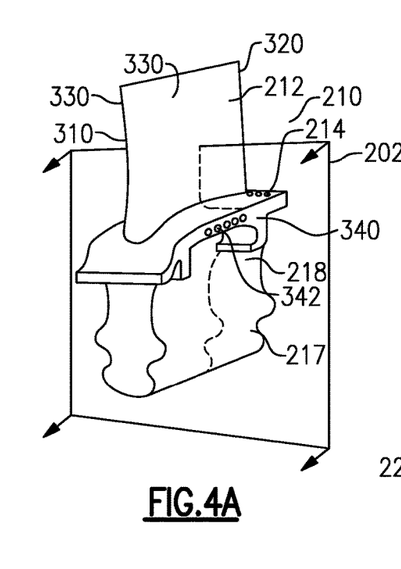
FIG. 4A schematically illustrates an isometric view of the flowpath component of FIG. 3.
Figure 4B:
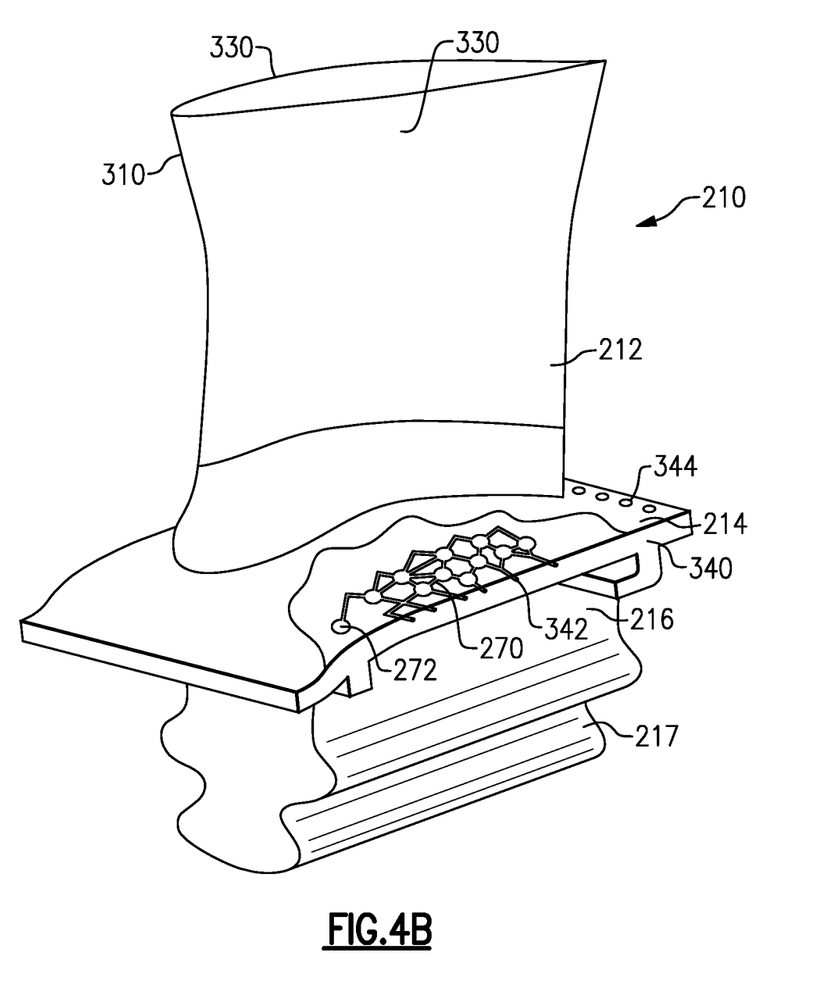
FIG. 4B schematically illustrates another isometric view of the flowpath component of FIG. 3.

With continued reference to FIG. 3, FIGS. 4A and 4B schematically illustrate isometric views of the rotor blade 210 isolated from the context of the gas turbine engine 20. As described above, the rotor blade 210 includes a flowpath body 212, a platform 214, a neck portion 218, and a fir tree connection feature 217. A cross sectional plane 202 passes through the rotor blade 210, and provides the viewing reference for FIG. 5. The flowpath body 212 includes a leading edge 310 and a trailing edge 320, with two surfaces 330 extending between the leading edge 310 and the trailing edge 320. The platform 214 includes a circumferentially facing surface 340 referred to as a mating face. The circumferentially facing surface 340 faces a corresponding circumferentially adjacent surface on a rotor blade 210 adjacent to the illustrated rotor blade 210, while the rotor blade 210 is in an installed position.

Positioned on the circumferentially facing surface 340 are multiple exit holes 342. Positioned on the aft end of the platform 214 are multiple exit holes 344. The exit holes 342, 344 allow purge air that has passed through the vascular engineered lattice structure 270 to exit the platform 214 into the flowpath. One or more openings 272 (hidden in FIG. 4A) are included and allow the communication of purge air from the neck cavity 264 (illustrated in FIG. 3) into the vascular engineered lattice structure 270 within the platform 214. In the illustrated example, the openings 272 are positioned at a forward portion of the platform 214. In alternative examples, the openings 272 can be positioned elsewhere on the platform 214, or distributed about the radially inward facing surface of the platform 214.

With continued reference to FIGS. 2-4B, FIG. 5 schematically illustrates a cross section of an example blade 210 cut along the viewing plane 202, and in an installed position. Each rotor blade 210 is connected to a rotor disk 220 via the fir tree interface 222. Purge air passes through the seal 260 (illustrated in FIG. 3) along an air leakage pathway 262 into the neck cavity 264. Once in the neck cavity 264, a portion of the air passes through a standard leakage pathway between the rotor blades 210 into the primary flowpath. Another portion of the leakage air from the neck cavity passes through the inlet 272 into the vascular engineered lattice structure 270.

In some examples, the air entering the inlet 272 passes through internal structures of the vascular engineered lattice structure 270. In alternative examples, the vascular engineered lattice structure 270 includes hollow members and passages, and the air entering the inlet passes through the hollow members and passages, thereby providing internal cooling via the vascular engineered lattice structure. Non-limiting examples of each above described type of vascular engineered lattice structures 270 are described below with regards to FIGS. 6-12.

Figure 5:
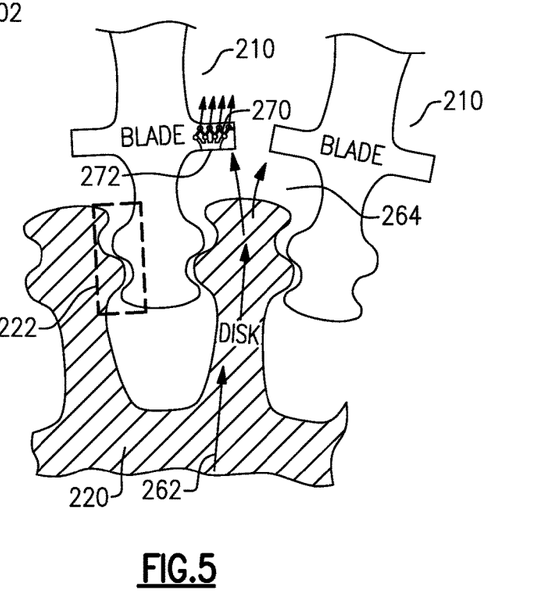
FIG. 5 schematically illustrates an aft facing view of a partial section of a gas turbine engine from a forward position.

After passing through the vascular engineered lattice structure 270, the air exits via multiple exit holes as described above, and enters the flowpath.

While illustrated and described above with regards to utilization within a platform supporting a rotor blade, one of skill in the art having the benefit of this disclosure will appreciate that the vascular engineered lattice structure could be incorporated in a platform supporting any type of flowpath component and is not limited to a blade. By way of example, the vascular engineered lattice structure could be incorporated in and cool one, or both, of the platforms supporting a flow correcting vane, a flowpath pass through, or any other component at least partially spanning the flowpath. In the example of a vane supported by two platforms, the vascular engineered lattice structure can extend through the vane and a single vascular engineered lattice structure can be disposed within both platforms. In alternative examples of a vane supported by two platforms, the vascular engineered lattice structures in each platform can be wholly independent of each other.

Figure 6:
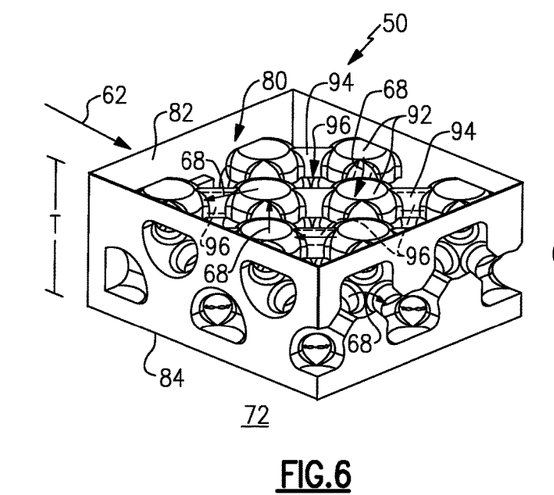
FIG. 6 shows one exemplary vascular engineered lattice structure of a gas turbine engine component.
Figure 7:
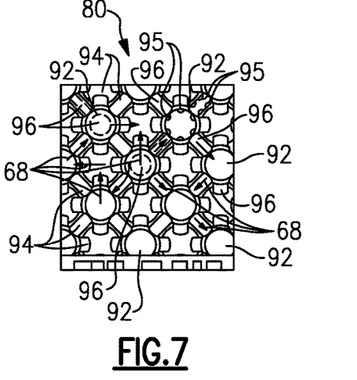
FIG. 7 illustrates another view of the vascular engineered lattice structure of FIG. 6.

FIGS. 6 and 7 illustrate one exemplary vascular engineered lattice structure 80 that can be incorporated into a component 50. The vascular engineered lattice structure 80 may be incorporated into any section or sections of a gas turbine engine component. In this disclosure, the term "vascular engineered lattice structure" denotes a structure of known surface and flow areas that includes a specific structural integrity.

As discussed in greater detail below, the vascular engineered lattice structure 80 of FIGS. 6 and 7 is a hollow vascular structure. The hollow vascular structure shown in FIGS. 6 and 7 defines a solid material with discrete, interconnected cooling passages that are connected through common nodes to control the flow of airflow throughout the hollow vascular structure.

The specific design and configuration of the vascular engineered lattice structure 80 of FIG. 6 is not intended to limiting. It will be appreciated that because the vascular engineered lattice structure 80 is an engineered structure, the vascular arrangement of these structures can be tailored to the specific cooling and structural needs of any given gas turbine engine component. In other words, the vascular engineered lattice structure 80 can be tailored to match external heat load and local life requirements by changing the design and density of the vascular engineered lattice structure 80. The actual design of any given vascular engineered lattice structure may depend on geometry requirements, pressure loss, local cooling flow, cooling air heat pickup, thermal efficiency, overall cooling effectiveness, aerodynamic mixing, and produceability considerations, among other gas turbine engine specific parameters. In one embodiment, the vascular engineered lattice structure 80 is sized based on a minimum size that can be effectively manufactured and that is not susceptible to becoming plugged by dirt or other debris.

The exemplary vascular engineered lattice structure 80 extends between a first surface 82 and a second surface 84 of the component. The first surface 82 is spaced from the second surface 84. The first surface 82 may be exposed to a gas path 62, whereas the second surface 84 may be remotely positioned from the gas path 62. For example, the second surface 84 could face radially inward into a neck cavity. The vascular engineered lattice structure 80 includes a thickness T between the first surface 82 and the second surface 84. The thickness T can be of any dimension.

Airflow 68 filters through the vascular engineered lattice structure 80 to convectively cool the component 50. In this disclosure, the term "through" is defined to include either inside of or around the vascular surfaces of the vascular engineered lattice structure. In one embodiment, the vascular engineered lattice structure 80 embodies a hollow configuration in which the airflow 68 may be circulated inside of the various passages defined by the vascular engineered lattice structure 80. For example, the hollow configuration of the vascular engineered lattice structure 80 may establish a porous flow area for the circulation of airflow 68. Additionally, airflow 68 could be communicated over and around the vascular engineered lattice structure 80.

The vascular engineered lattice structure 80 can be manufactured by using a variety of manufacturing techniques. For example, the vascular engineered lattice structure 80 may be created using an additive manufacturing process such as direct metal laser sintering (DMLS). Another additive manufacturing process that can be used to manufacture the vascular engineered lattice structure 80 is electron beam melting (EBM). In another embodiment, select laser sintering (SLS) or select laser melting (SLM) processes may be utilized.

In yet another embodiment, a casting process can be used to create the vascular engineered lattice structure 80. For example, an additive manufacturing process can be used to produce a refractory metal core (RMC), including but not limited to a molybdenum core, that can be used to cast the vascular engineered lattice structure 80. In one embodiment, the additive manufacturing process includes utilizing a powder bed technology and the casting process includes a lost wax process.

The exemplary vascular engineered lattice structure 80 includes a plurality of nodes 92, a plurality of branches 94 that extend between the nodes 92, and a plurality of hollow passages 96 between the branches 94 and the nodes 92. The number, size and distribution of nodes 92, branches 94 and hollow passages 96 can vary from the specific configuration shown. In other words, the configuration illustrated by FIG. 7 is but one possible design.

The branches 94 may extend orthogonally or non-orthogonally to the nodes 92. The nodes 92 and branches 94 can be manufactured as a single contiguous structure made of the same material. In one embodiment, the nodes 92 and branches 94 are uniformly distributed throughout the vascular engineered lattice structure 80. In another embodiment, the nodes 92 and branches 94 are non-uniformly distributed throughout the vascular engineered lattice structure 80.

In this "hollow lattice" structure configuration, airflow 68 can be circulated inside hollow passages 69 of the nodes 92 and the branches 94 to cool the component 50 in the space between the walls 82, 84 (see FIG. 6). For example, the "hollow" lattice structure may include multiple continuous hollow spoke cavity passages 69 thru which airflow 68 is passed. The airflow 68 flows from each of the hollow branches 94 and coalesces into the nodes 92, which serve as a plenum for the airflow 68 to be redistributed to the next set of hollow branches 94 and nodes 92. The "hollow" lattice structure forms multiple circuitous continuous passages in which the airflow 68 flows to maximize the internal convective cooling surface area and coolant mixing. Additionally, airflow 68 could be communicated over and around the nodes 92 and branches 94 of the vascular engineered lattice structure 80.

The nodes 92 and the branches 94 additionally act as structural members that can be tailored to "tune" steady and unsteady airfoil vibration responses in order to resist and optimally manage steady and unsteady pressure forces, centrifugal bending and curling stresses, as well as provide for improved airfoil local and section average creep and untwist characteristics and capability. In one embodiment, one or more of the nodes 92 and branches 94 may include augmentation features 95 (shown schematically in FIG. 7) that augment the heat transfer effect of the airflow 68 as it is communicated through the vascular engineered lattice structure 80. The augmentation features 95 can also be made using the additive manufacturing processes describe above.

As mentioned above, the vascular arrangement of the vascular engineered lattice structure 80 can be tailored to the specific cooling and structural needs of any given gas turbine engine component. For example, a first portion of the vascular engineered lattice structure 80 can include a different combination of nodes 92, branches 94 and hollow passages 96 compared to a second portion of the vascular engineered lattice structure 80. In one embodiment, a first portion of the vascular engineered lattice structure 80 may include a greater amount of cooling area whereas a second portion of the vascular engineered lattice structure 80 may provide a greater amount of structural area.

FIGS. 5 and 6 illustrate another exemplary vascular engineered lattice structure 180. In this embodiment, the vascular engineered lattice structure 180 embodies a solid lattice structure in which airflow is communicated over and around the solid lattice structure thereby governing flow and providing structural support. The vascular engineered lattice structure 180 is disposed between a first wall 182 and a second wall 184 of the component 50.

Figure 8:
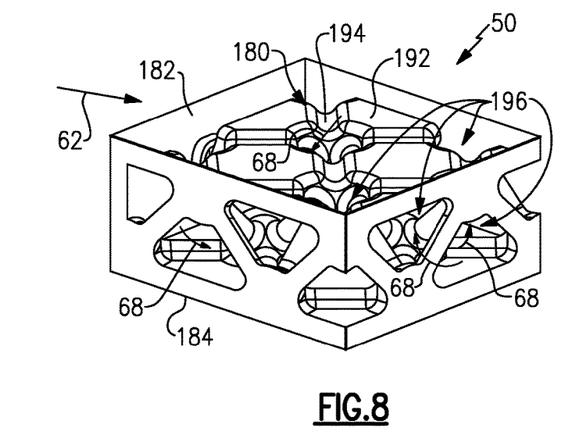
FIG. 8 illustrates another exemplary vascular engineered lattice structure.
Figure 9:
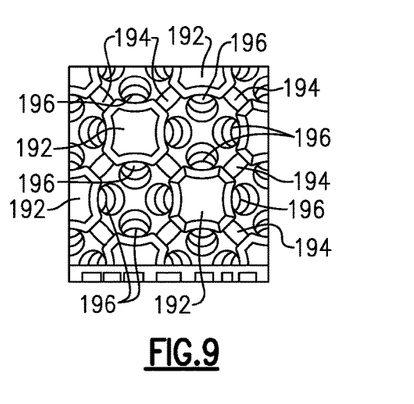
FIG. 9 illustrates another view of the vascular engineered lattice structure of FIG. 8.

The vascular engineered lattice structure 180 includes a plurality of nodes 192, a plurality of branches 194 that extend between the nodes 92, and a plurality of open passages 196 between the branches 194 and the nodes 192. The nodes 192, branches 194 and open passages 196 can be manufactured as a single contiguous structure made of the same material.

In this "solid" lattice structure configuration, airflow 68 can be circulated through the open passages 196 to cool the component 50 in the space between the walls 182, 184. In other words, in contrast to the hollow lattice structure embodiment which communicates airflow through the insides of the nodes 192 and branches 194, the airflow 68 is circulated over and around these parts as part of a porous flow area. For example, the "solid" lattice structure includes multiple continuous solid branches 194 over which airflow 68 is passed. The "solid" lattice structure forms circuitous passages for the airflow 68 to traverse around as it migrates through the vascular engineered lattice structure to maximize the convective cooling surface area and coolant mixing around the nodes 192 and the branches 194. The nodes 192 and the branches 194 additionally act as structural members that resist pressure, rotation forces, and loads.

The exemplary vascular engineered lattice structure 180 establishes a ratio of cooling area to structural area. The cooling area is established by the open passages 196, while the nodes 192 and branches 194 determine the amount of structural area. In one embodiment, the amount of cooling area exceeds the structural area (cooling area>structural area). In another embodiment, a ratio of the cooling area to the structural area is less than 1 (cooling area<structural area). In yet another embodiment, a ratio of the cooling area to the structural area is between 1 and 4. Other configurations are also contemplated.

Figure 10:
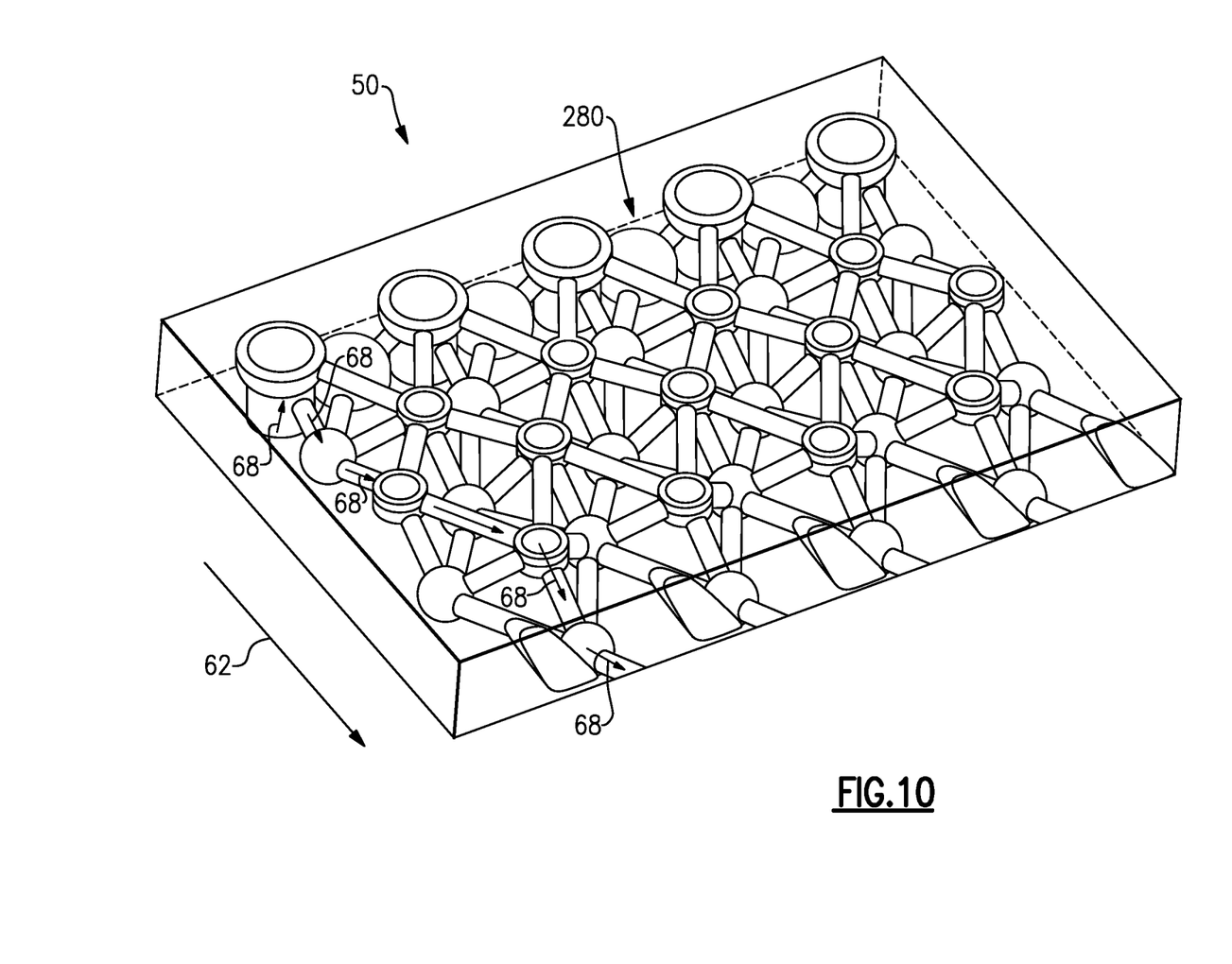
FIG. 10 illustrates another vascular engineered lattice structure embodiment having a co-flow design.

The vascular engineered lattice structures can be configured in either a co-flow or counter-flow heat exchanger design concepts. For example, FIG. 10 depicts a vascular engineered lattice structure 280 providing a co-flow design. In other words, the airflow 68 is circulated through the vascular engineered lattice structure 280 in substantially the same direction as the gas path 62 flow direction. Although a hollow configuration is depicted, a co-flow design could also be incorporated into a "solid" configuration.

Figure 11:
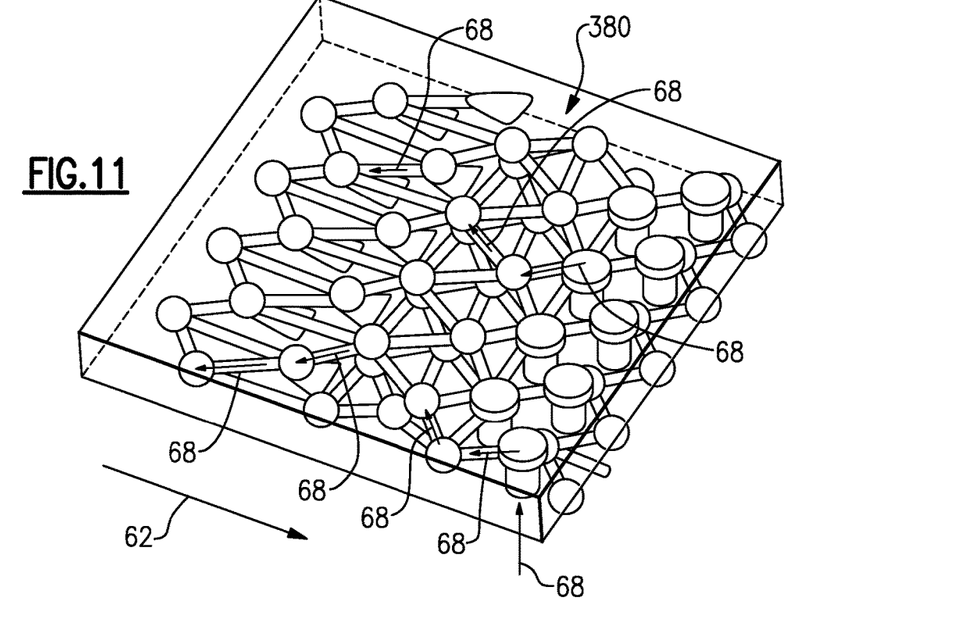
FIG. 11 illustrates another embodiment of a vascular engineered lattice structure embodying a counter-flow design.

FIG. 11 illustrates yet another exemplary vascular engineered lattice structure 380 that could be incorporated into a gas turbine engine component. In this embodiment, the vascular engineered lattice structure 380 provides a counter-flow design. In other words, the airflow 68 is circulated through the vascular engineered lattice structure 380 in a direction that is generally opposite to the flow direction of the gas path 62.

Figure 12:
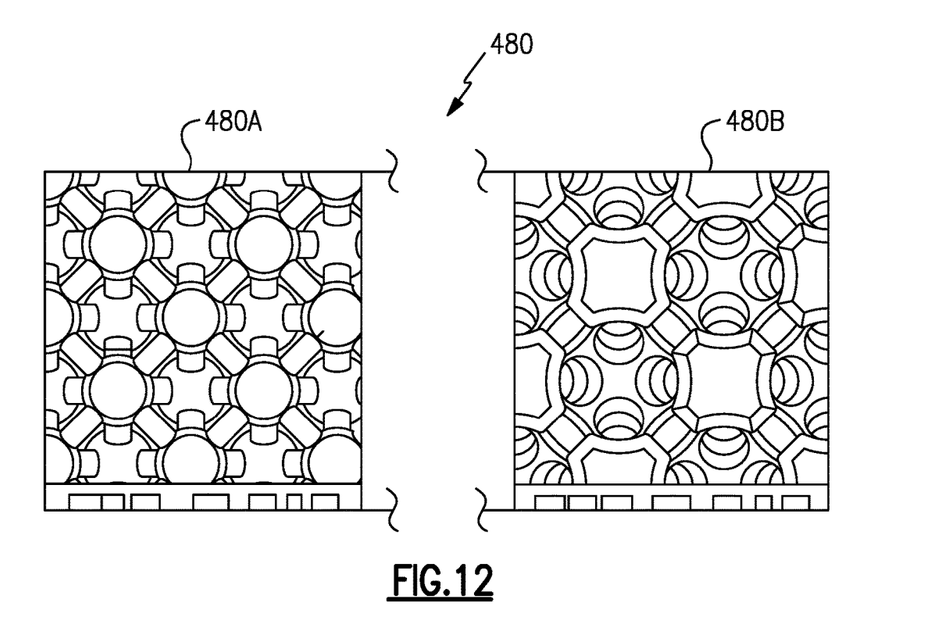
FIG. 12 illustrates yet another exemplary vascular engineered lattice structure.

FIG. 12 illustrates yet another exemplary vascular engineered lattice structure 480 that could be incorporated into a gas turbine engine component. In this embodiment, the vascular engineered lattice structure 480 includes a first portion 480A that can include a hollow lattice structure and a second portion 480B that can include a solid lattice structure. The distribution of interchangeability of the hollow and solid lattice structures is dependent on design requirements and other considerations.

The exemplary vascular engineered lattice structures described in this disclosure may be incorporated into any relatively high heat load gas turbine engine applications where convective cooling is desired. Among other possible design configurations, the vascular engineered lattice structures of this disclosure may be implemented as a co-flow or counter-flow configurations to more efficiently provide localized convective cooling to achieve extended component operating life.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A flowpath component for a gas turbine engine comprising:
   a first platform including a vascular engineered lattice structure;
   a body extending from, and supported by, the first platform;
   the body being configured to at least partially span a flowpath in an installed position;
   the vascular engineered lattice structure including at least one purge air inlet, and at least one spent air outlet; and
   wherein the at least one spent air outlet includes at least one opening on a mating surface of said platform.

2. The flowpath component of claim 1, wherein the at least one purge air inlet is an opening on a radially inward facing surface of said platform.

3. The flowpath component of claim 2, wherein the radially inward facing surface of said platform at least partially defines a neck cavity.

4. The flowpath component of claim 1, wherein the mating surface is configured to face a mating surface of an adjacent platform in an installed configuration.

5. The flowpath component of claim 1, wherein the at least one spent air outlet includes at least one opening on a gas path surface of the platform.

6. The flowpath component of claim 5, wherein the gas path surface is a radially outward facing surface of the platform.

7. The flowpath component of claim 1, wherein the purge air inlet is configured to admit air sourced in a cavity circumferentially adjacent a neck of said flowpath component.

8. A cooling system for a gas turbine engine comprising:
   a flowpath component having a first platform including a vascular engineered lattice structure and a body extending radially from said platform, the body at least partially spanning a flowpath;
   a purge air source adjacent a root of said flowpath component and fluidly connected to the vascular engineered lattice structure; and
   wherein the first platform further includes a circumferentially facing mating surface, and wherein the circumferentially facing mating surface includes at least one exit hole fluidly connecting the vascular engineered lattice structure to a primary flowpath.

9. The cooling system of claim 8, wherein the first platform further includes a radially inward facing surface at least partially defining a neck cavity, the radially inward facing surface further including at least one inlet to said vascular engineered lattice structure.

10. The cooling system of claim 8, wherein the first platform further includes a radially outward facing surface having a plurality of exit holes fluidly connecting the vascular engineered lattice structure to a primary flowpath.

11. The cooling system of claim 10, wherein the exit holes are positioned on an aft half of said radially outward facing surface.

12. The cooling system of, wherein the first platform further includes a radially outward facing surface having a second plurality of exit holes fluidly connecting the vascular engineered lattice structure to primary flowpath.

13. A method of cooling a platform within a gas turbine engine comprising:
   supporting at least one flowpath component via a first platform;
   passing cooling air through a vascular engineered lattice structure within said platform, thereby cooling at least one external surface of said platform;
   expelling air from said vascular engineered lattice structure into a primary flowpath of the gas turbine engine; and
   wherein said step of expelling includes expelling said air from at least one opening on a mating surface of said first platform.

14. The method of claim 13, wherein said mating surface is configured to face a mating surface of an adjacent platform in an installed configuration.

15. A flowpath for a gas turbine engine comprising:
   a first platform including a vascular engineered lattice structure;
   a body extending from, and supported by, the first platform;
   the body being configured to at least partially span a flowpath in an installed position;
   the vascular engineered lattice structure including at least one purge air inlet, and at least one spent air outlet; and
   wherein a lattice cavity is defined between internal surfaces of said first platform and external surfaces of said vascular engineered lattice structure, and said vascular engineered lattice structure is defined by a plurality of nodes and a plurality of branches each extending from at least one of said plurality of nodes, with at least some nodes of said plurality of nodes spaced apart from said internal surfaces.

16. The flowpath component of claim 15, wherein said vascular engineered lattice structure is a hollow vascular structure in which respective internal passages are defined within each node of said plurality of nodes and within each branch of said plurality of branches for communicating fluid, said internal passages being distinct from said lattice cavity.

17. The flowpath component of claim 15, wherein said vascular engineered lattice structure is a solid vascular structure in which fluid is communicated in said lattice cavity over and around said plurality of nodes and said plurality of branches.

* * * * *

UNITED STATES PATENT AND TRADEMARK OFFICE
CERTIFICATE OF CORRECTION

PATENT NO. : 10,221,694 B2
APPLICATION NO. : 15/045644
DATED : March 5, 2019
INVENTOR(S) : Daniel A. Snyder It is certified that error appears in the above-identified patent and that said Letters Patent is hereby corrected as shown below:

In the Claims

In Claim 12, Column 12, Line 15; replace "system of, wherein" with --system of claim 8, wherein--

In Claim 12, Column 12, Line 18; replace "to primary flowpath" with --to the primary flowpath--

Signed and Sealed this
Twenty-fourth Day of May, 2022

Katherine Kelly Vidal
*Director of the United States Patent and Trademark Office*